(12) United States Patent
Lindberg et al.

(10) Patent No.: US 7,941,754 B2
(45) Date of Patent: May 10, 2011

(54) MEDIA CONTENT DISTRIBUTION INDICATOR

(75) Inventors: Phillip John Lindberg, Helsinki (FI); Sami Johannes Niemela, Helsinki (FI)

(73) Assignee: Nokia Corporation, Espoo (FI)

( * ) Notice: Subject to any disclaimer, the term of this patent is extended or adjusted under 35 U.S.C. 154(b) by 984 days.

(21) Appl. No.: 11/770,894

(22) Filed: Jun. 29, 2007

(65) Prior Publication Data

US 2009/0006609 A1 Jan. 1, 2009

(51) Int. Cl.
*G06F 3/00* (2006.01)
(52) U.S. Cl. ........................................ 715/752
(58) Field of Classification Search .................. 715/752, 715/863, 702, 701
See application file for complete search history.

(56) References Cited

U.S. PATENT DOCUMENTS

| 6,460,074 | B1 | 10/2002 | Fishkin | |
|---|---|---|---|---|
| 6,671,718 | B1 | 12/2003 | Meister et al. | |
| 7,181,695 | B2 * | 2/2007 | Jaeger | 715/752 |
| 7,590,944 | B2 * | 9/2009 | Weber et al. | 715/780 |
| 2006/0053392 | A1 * | 3/2006 | Salmimaa et al. | 715/864 |
| 2008/0178098 | A1 * | 7/2008 | Yoon et al. | 715/762 |

FOREIGN PATENT DOCUMENTS

| EP | 1 022 648 A | 7/2000 |
|---|---|---|
| WO | 2006/013518 A | 2/2006 |

* cited by examiner

*Primary Examiner* — Boris Pesin
*Assistant Examiner* — Omar Abdul-Ali
(74) *Attorney, Agent, or Firm* — Perman & Green, LLP

(57) ABSTRACT

A method includes providing an expandable element associated with a message transmit key of a device. An outer border of the expandable element moves or expands to reflect a number of recipients of a message to be sent from the device. The message transmit key of the device is contacted to cause the initiation of the message transmitted to each of the recipients, and a size of an inner region within the outer border is expanded to reflect a state of the message transmission to each of the recipients, wherein the size of the inner regions expands to fill an area within the outer border in order to send the message to each recipient.

24 Claims, 9 Drawing Sheets

As the distribution list is added the
"Dispersion Frame" (grey outline above)

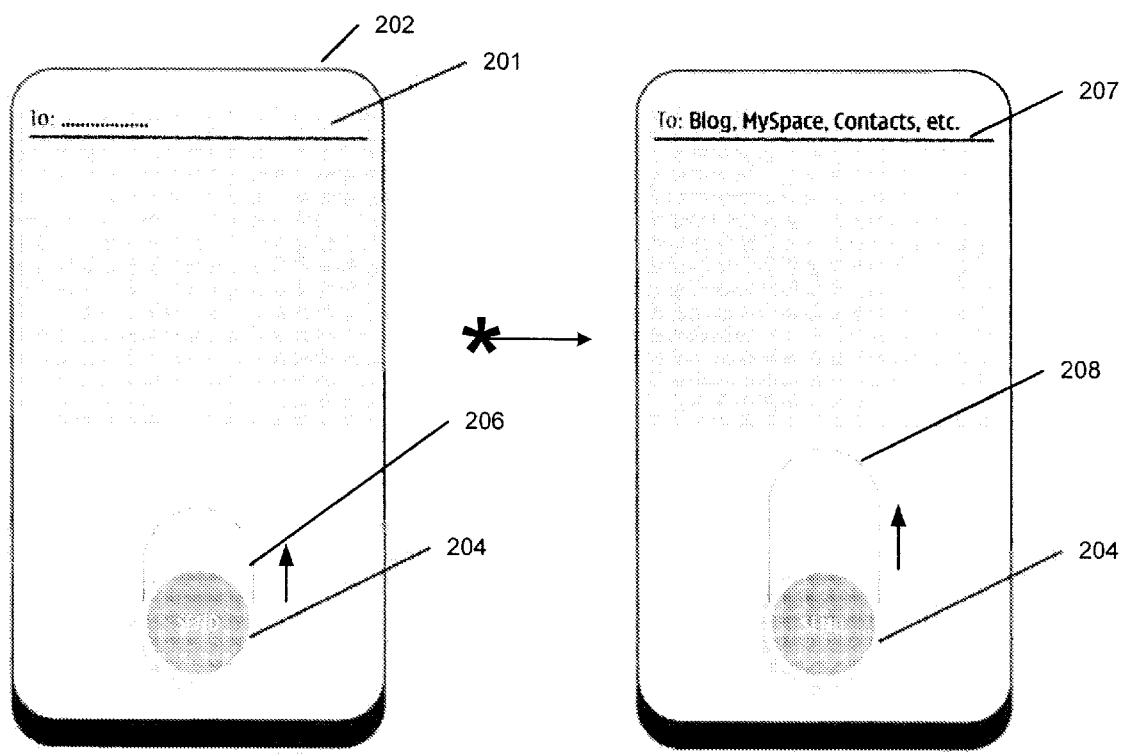
FIG. 2A — A message is being prepared for sending/posting > the distribution list
FIG. 2B — As the distribution list is added the "Dispersion Frame" (grey outline above)

MEDIA CONTENT DISTRIBUTION INDICATOR

BACKGROUND

1. Field

The disclosed embodiments generally relate to user interfaces and in particular to monitoring media content dispersion potential.

2. Brief Description of Related Developments

With the growth of electronic mail ("email") and email applications, messaging, and digital content publishing more or more people communicate via electronic communication channels. Electronic and digital communication channels can be used to describe synchronous and asynchronous forms of media transmission, and can include for example, instant messaging (IM), email, blogs, wikis, image uploads and video sharing services. It is very common to have more than one recipient of an electronic communication, such as for example an email. For example, with respect to email, quite frequently, email "distribution" lists are created for sending emails to more than one recipient. These lists of email addresses can become quite lengthy. Thus, when sending emails, it is commonplace to address an email to be received by more than one recipient.

Similarly, when replying to an email that has more than one recipient, a "reply all" function easily allows one to send a reply, not just to the sender of the email, but to every other person who has received the initial email. While these functions make it quite easy to send emails to more than one person, the ease with which one is able to do so also makes it quite easy to accidentally send an email to a group of recipients, when only one recipient was intended or desired. Thus, it would be advantageous to provide a mechanism by which one can detect that an email is destined to be sent to more than one recipient as the email is being sent, or just before it is actually transmitted.

Furthermore, media sharing services contribute to a metadata pool that can be utilized to give the user feedback on the dispersion potential of media content. This metadata pool is changing constantly and thus can provide a real-time dynamic parameter, different from a static recipient list. It would also be advantageous to harness the capabilities of a real-time dynamic media distribution component in order to selectively distribute media content.

SUMMARY

In one aspect, the disclosed embodiments are directed to a method. In one embodiment the method includes providing an expandable element associated with a message transmit key of a device. An outer border of the expandable element moves or expands to reflect a number of recipients of a message to be sent from the device. The message transmit key of the device is contacted to cause the initiation of the message transmitted to each of the recipients, and a size of an inner region within the outer border is expanded to reflect a state of the message transmission to each of the recipients, wherein the size of the inner regions expands to fill an area within the outer border in order to send the message to each recipient.

In another aspect, the disclosed embodiments are directed to a user interface. In one embodiment the user interface has an expandable element associated with a message transmit key of a device. The expandable element also has a defined outer border region. The defined outer border region is configured to move away from an origin of the expandable element in an outward direction to reflect a number of recipients of a message to be sent from the device. The message transmit key of the device is configured to cause the initiation of the message transmitted to each of the recipients, and a defined region within the outer border region configured to move away from the origin of the expandable element to reflect a state of the message transmission to each of the recipients. The size of the inner regions expands to fill an area within the outer border in order to send the message to each recipient.

In a further aspect the disclosed embodiments are directed to an apparatus. In one embodiment, the apparatus includes a controller configured to process, receive and transmit media content; an input device coupled to the controller; and a display interface device coupled to the controller, wherein the controller further comprises a processor. The processor is configured to provide an expandable element associated with a media content transmit key of the input device; expand an outer border of the expandable element to reflect a number of recipients designated to receive media content to be sent from the apparatus to the recipients; cause the initiation of the media content transmission to when a media content transmit input is received from the media content transmit key of the input device; and expand a size of an inner region within the outer border to reflect a state of the media content transmission as a force is applied to the media content transmit key, wherein the size of the inner regions expands to fill an area within the outer border to correspond with enabling the media content to be transmitted to each recipient prior to the media content transmission from the apparatus.

In a further aspect the disclosed embodiments are directed to a system. In one embodiment the system includes means for providing an expandable element associated with a media content transmit key of a device; means for expanding an outer border of the expandable element to reflect a number of recipients of a media content to be sent from the device; means for detecting activation of a media content transmit key of the device to cause an enablement of the initiation of the transmission of the media content to each of the recipients; and means for expanding a size of an inner region within the outer border to reflect a state of the enablement of the media content transmission to each of the recipients, wherein the size of the inner regions expands to fill an area within the outer border in order to enable the transmission of the media content to each recipient.

In yet another aspect the disclosed embodiments are directed to a computer program product. In one aspect the computer program product stored in a memory includes a computer useable medium having computer readable code means embodied therein for causing a computer to transmit media content. The computer readable code means in the computer program product includes computer readable program code means for causing a computer to expand an outer border of an expandable element on a display of a device to correspond to a number of designated recipients of the media content; computer readable program code means for causing a computer to recognize a command to expand an element within an area encompassed by the outer border to initiate enablement of the media content transmission; computer readable program code means for causing a computer to expand the element with the area for the duration of the command; computer readable program code means for causing a computer to generate an indication when the element within the area encompassed by the outer border is filled by the element; and computer readable program code means for causing a computer to transmit the media content to the designated recipients upon recognition of a transmit command.

BRIEF DESCRIPTION OF THE DRAWINGS

The foregoing aspects and other features of the embodiments are explained in the following description, taken in connection with the accompanying drawings, wherein:

FIGS. 2A-2E are illustrations of exemplary screen shots of the user interface of the disclosed embodiments.

DETAILED DESCRIPTION OF THE EMBODIMENT(s)

Figure 1:
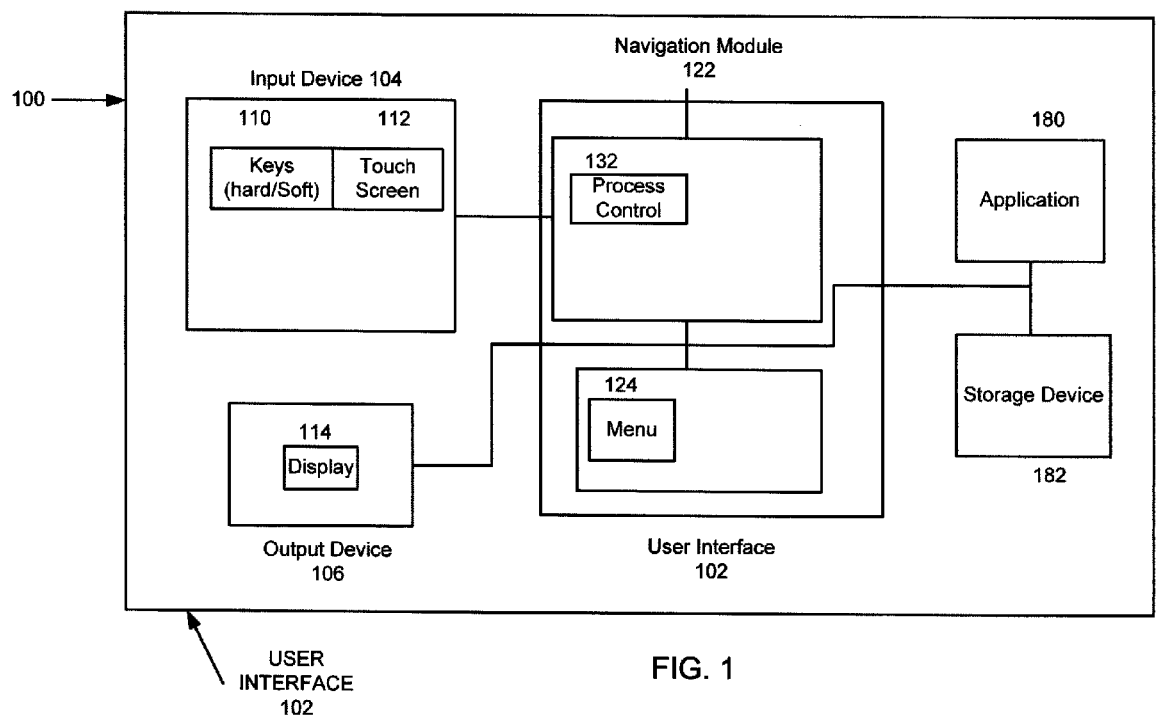
FIG. 1 shows a block diagram of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1, to receive information and feedback based on virtual resistance or some other indicator, when sending media content, such as for example an email, to more than one recipient. While the disclosed embodiments will generally be described herein with respect to email, the disclosed embodiments are not so limited and can generally be applied to encompass the pushing or publishing of any digital content that is under user control. The disclosed embodiments are not only related to sending content such as messages and email, but can also be directed to sharing media and experiences and revealing status and presence. For example, an email might be sent with a song attachment. The email could be sent to one or more recipients. The larger the attachment, the longer it will take to send the email. With respect to presence, sending an instant message to a recipient that is "away from their computer", "not online", "not available" or subject to a "do not disturb" indication could require a greater effort than if the user was simply "available", "present" or "online."

In one embodiment, the more recipients designated to receive the media content, the greater will be the effort required on the part of the user to send the content to each recipient. This effort can include for example, more pressure, a longer period of time, a type of motion or other user action. This "effort" is distinguished from the mere pressing of a "send" key, as is commonly in use today. This provides the general advantage that user will not inadvertently send media content to more recipients than is intended. The terms "select", "move", "drag" "contact", "press" and "touch" are generally described herein with respect to a touch-screen display. However, in alternate embodiments, the terms are intended to encompass the required user action with respect to other input devices. For example, with respect to a proximity screen device, it is not necessary for the user to make direct contact in order to select, move, contact, press a button or other object on the display. Thus, the above-noted terms are intended to encompass that a user only needs to be within the proximity of the device to carry out the desired function. For example, the term "contact" or "press" when used in the context of a proximity screen device, does not imply direct contact, but rather near or close contact, that activates the particular function displayed on proximity device. Similarly, the scope of the intended devices is not limited to single touch or contact devices. Multi-touch devices, where contact by one or more fingers or other pointing devices can navigate on and about the screen.

In one embodiment, referring to FIG. 1, the system 100 of FIG. 1 can include an input device 104, output device 106, navigation module 122, applications area 180 and storage/memory device 182. The components described herein are merely exemplary and are not intended to encompass all components that can be included in a system 100. For example, in one embodiment, the system 100 comprises a mobile communication device or other such internet and application enabled devices. Thus, in alternate embodiments, the system 100 can include other suitable devices and applications for regulating how media content is distributed. While the input device 104 and output device 106 are shown as separate devices, in one embodiment, the input device 104 and output device 106 can be part of, and form, the user interface 102. The user interface 102 can be used to display application and element information to the user, and allow the user to obtain application content and application activity data. For example, the user interface 102 can allow the user to view the possible distribution lists, make changes, and provide the inputs and commands required to distribute the content in accordance with the disclosed embodiments.

In one embodiment, the user interface of the disclosed embodiments can be implemented on or in a device that includes a touch screen display or a proximity screen device. In alternate embodiments, the aspects of the user interface disclosed herein can be embodied on any suitable device that will display information and allow the selection and activation of applications.

FIG. 2A illustrates one embodiment of a screen shot of a user interface 202 incorporating features of the disclosed embodiments. The example of FIG. 2A relates to the message screen of an email application. In this example, a message is being prepared for sending or posting. A email distribution list can be added or inserted in the "To" field 201. In the lower part of the display 202 there is a "send" button 204. Adjacent to the "send" button 204 is a dispersion indicator 206. The dispersion indicator 206 can take any suitable form. In one embodiment, as recipients are added to the "To" field 201, the dispersion indicator 206 expands or moves. In one embodiment, the frame of the indicator 206 can move in an upward direction, as shown for example in FIG. 2B. In alternate embodiments, any suitable indicator can be used to display the relative number of recipients entered into the "to" field of an email or other such message application, such as for example, instant messaging, text messaging (SMS), and multi media services (MMS) or chat. Also included can be non-message applications, such as for example video sharing programs. For example, in one embodiment the dispersion indicator 206 could appear or present like a thermometer. In alternate embodiments any suitable animation or graphic can be used, such as for example, a circle or a balloon. These particular examples illustrate objects that can be filled, and the filling can be monitored. This is in keeping with the concept of monitoring and regulating the quantity of distribution of content. The greater the number of recipients, the larger the area to be filled. In another embodiment, and actual number of recipients can be displayed in the dispersion indicator. Size variation of the dispersion indicator can also be used to reflect the relative number of recipients.

In the embodiment shown in FIG. 2B, as the distribution list grows, the dispersion indicator 208 moves upward, extending from or near the "send" button or key 204. When the list is complete, the user activates the "send" button 204. This can generally comprise touching or pressing the button 204. A second indicator 210 appears inside the dispersion indicator frame 212 and moves to the top of the dispersion indicator frame 212. When the indicator 210 reaches the top of the dispersion indicator frame 212, the message is sent to each of the recipients.

In one embodiment, the user contact, or proximity, with the send key 204 must be maintained and continuous, in order for the gradient indicator 210 to reach the top of the dispersion frame 212. If the send key 204 is released prior to the gradient indicator 210 reaching the top of the frame 212, the message is not sent. Thus, as more recipients are added to the "To" field 214, the greater is the area that the gradient indicator 210 must fill, and the longer the period the user must maintain contact with the send key 204. If the user had not intended for a message to be sent to a large number of recipients, the length of time required for contacting the send key 204 will be an immediate indication of a potential problem. The user can release the send key 204 before the gradient indicator 210 reaches the top of the frame 212 to prevent the message from being sent out or transmitted. In one embodiment, as the gradient indicator 210 approaches the top of the frame 212, a message can be presented to the user advising that the message is about to be sent. This additional message can appear as a pop-up, for example, to advise the user of any potential security risk of sending the message. In alternate embodiments, any suitable message or indicator might be displayed or presented to indicate that a message is about to be sent. This might be considered an additional security check.

In one embodiment, more force may be required to be applied to the send key 204 in order for the gradient indicator 210 to fill a larger area within the frame 212. Touch and pressure can be required to send messages with wide distribution. As the distribution list for media increases, additional efforts on the part of the user will be required to fill the frame 212 and send the email. In alternate embodiments, any suitable type of feedback can be used to send an email to a distribution list. This could include audio, visual, tactile or haptic for example. This provides the advantage that an email will not inadvertently be sent to a number of recipients, when that is not the intent, since more than just a simple press of the "send" key is required.

Figures 2C, 2D:
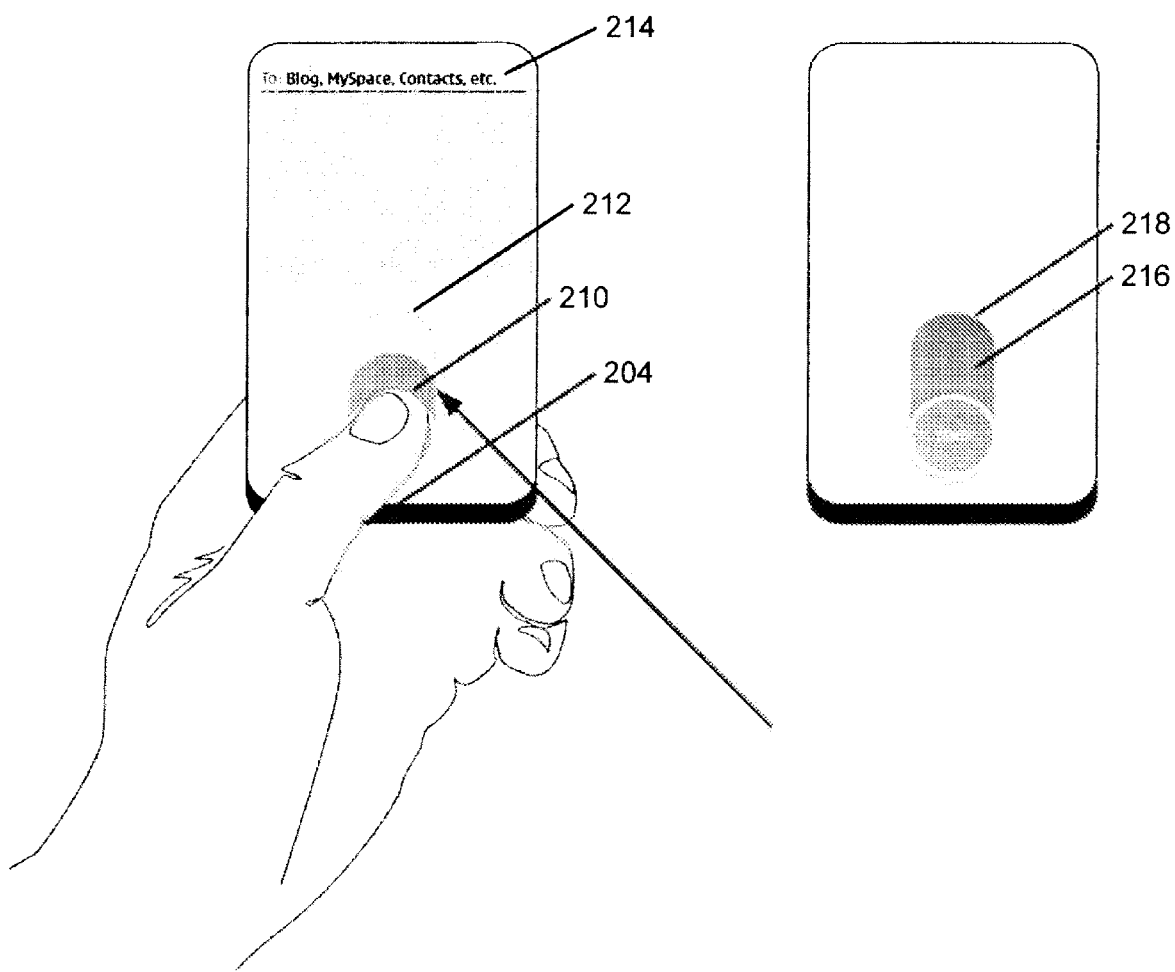
Figure 2E:
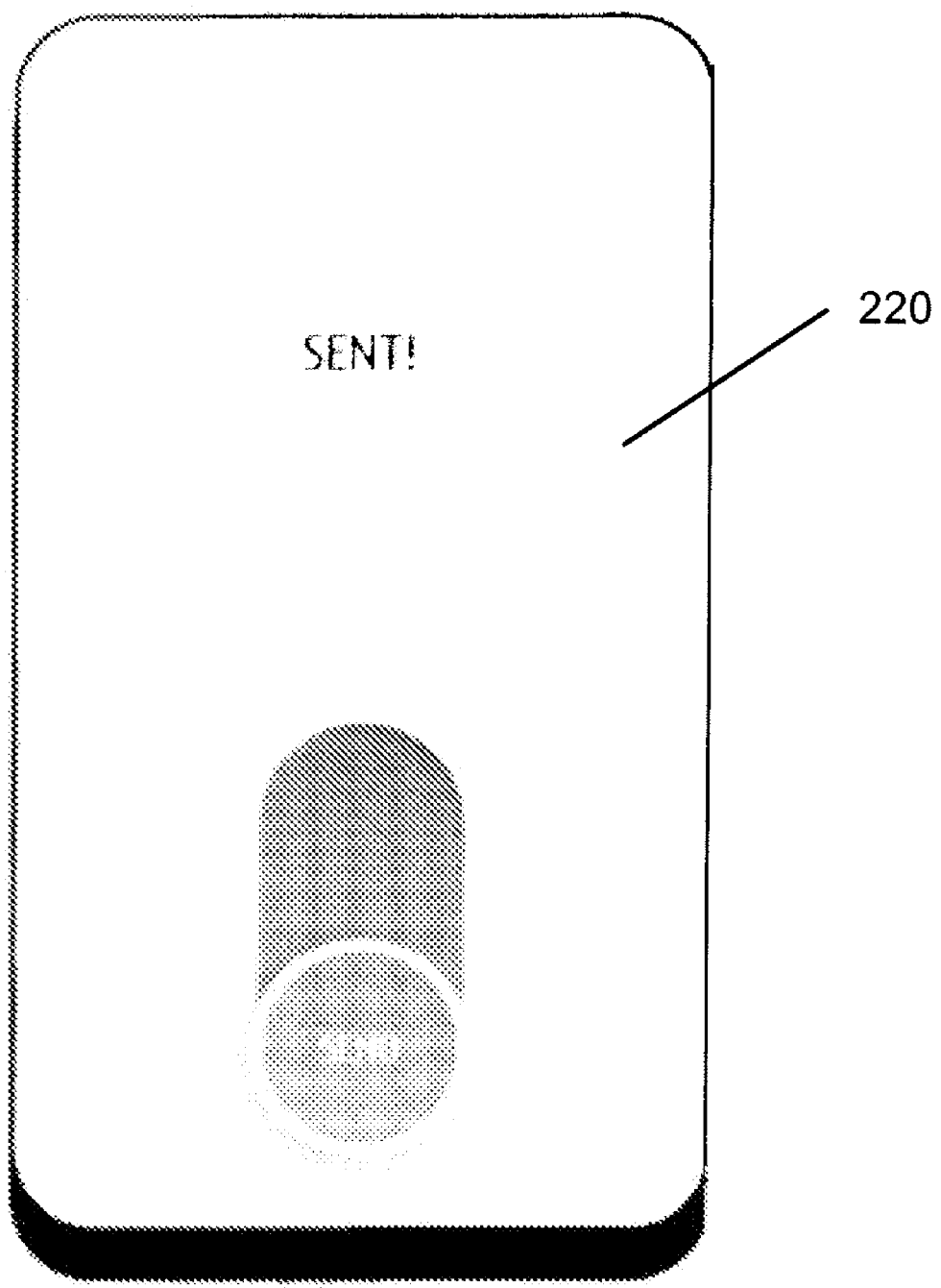

When the filling of the dispersion frame 212 is complete, as shown in FIG. 2D, where the gradient indicator 216 now completely fills the frame 218, the message will be distributed. A confirmation message can be sent as shown in FIG. 2E.

In one embodiment, the message or content to be sent could include a flag or other indicator that provides the user with information related to the type of effort, and how much effort is required to send the message or content, based on the current distribution parameters. The flag or indicator may also reflect the genus or category of the selected group. For example, a mailing list may have one type of flag, while a list of family members or work colleagues may have different flags. This provides the advantage of the user being able to easily identify the particular group selected to receive the message, without the need to view the particular distribution list. For example, referring to FIGS. 2A-2D, the colors, shapes or patterns of the dispersion indicators and frames 206, 208, 210 and 218, can be different for different groups. This can provide an immediate, visual indication, of the nature of the recipient group list. In alternate embodiments, different audio and tactile indicators could be used to distinguish groups from one another.

The right to add flags to contacts, mailing lists, media content can belong to the user and/or an administrator. In one embodiment, the right to add an effort flag to a particular group list or type of content, might be granted to a user at one level, and an administrator at another level. Such privileges can be pre-assigned and determined based on any suitable criteria.

In various applications, different criteria can be established for, and attached to the sending of content, such as messages, in addition to the number of recipients. For example, in messaging applications, the recipient fields will generally include a To field, a CC field and a BCC field. In one embodiment, the effort required to send may depend in part on the number of recipients in each of the fields. For example, in one embodiment, a lesser effort may be required if more contacts are in the BCC field than the TO field. Different relations can be drawn based on particular user requirements. In alternate embodiments, any suitable relationships between the number of contacts in each of the fields and the effort required to send, can be established.

Similarly, in some applications, messages can be ranked based on priority, security or importance. In one embodiment, the size of any attachment may also be a consideration in determining the type of effort required to send the message and attachment. The effort required according to the disclosed embodiments to send such messages and/or attachments can be based in part on the ranking or size. A message with higher importance, priority or security might require a greater level of effort, compared to a message that has a lower ranking attached to it. The embodiments disclosed herein will recognize such priority or security flags, and automatically adjust the level of effort required to send the message. This "effort" may also involve providing different visual, audio or tactile indicators, either alone or in combination.

Figure 3:
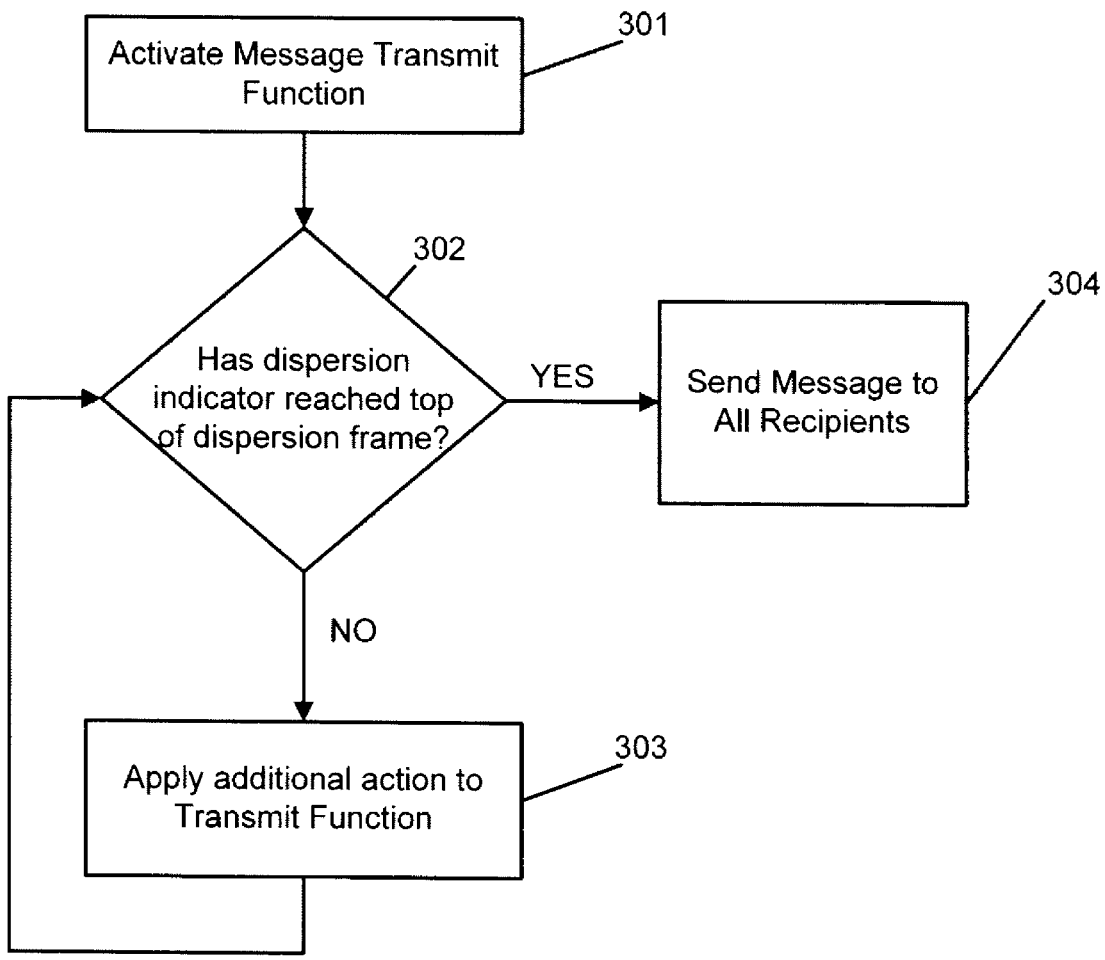
FIG. 3 is an illustration of exemplary screen shots of one aspect of the user interface of the disclosed embodiments.

FIG. 3 is a flowchart illustrating one aspect of the disclosed embodiments. The message transmit function of the device is activated 301. It is determined whether the dispersion indicator has reached a maximum level 302, such as the top of the dispersion frame. In alternate embodiments, the maximum level might be a countdown function, where the number of recipients is recorded. The maximum level would be an indication of all recipients. If the maximum level has not been reached, additional action is applied 303 to the transmit function. This could include maintaining contact with the transmit key, additional pressure, or even movement along an area of the dispersion indicator when a touch sensitive screen is used. For example, the user may need to move a finger or other pointer from one end of the dispersion indicator to the other end to complete the required action for sending the message. Once all action is complete and the dispersion frame is full, the message can be sent to all recipients.

The aspects of the disclosed embodiments can be implemented on any device that includes a user interface for the display and accessing of information, such as the system 100 shown in FIG. 1. In one embodiment, the input device 104 includes a touch screen display 112. The inputs and commands from a user, such as the touching of the screen, are received in the input module 104 and passed to the navigation module 122 for processing. The navigation module 122 can determine and set the state of the device. The output device 106, which in one embodiment is implemented in the touch screen display 112, can receive data from the user interface 102, application 180 and storage device 182 for output to the user.

Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The user input device 104 can include controls that allow the user to interact with and input information and commands to the device 100. For example, with respect to the embodiments described herein, the user interface 102 can comprise a touch screen display. The output device 106 can be configured to provide the content of the exemplary screen shots shown herein, which are presented to the user via the functionality of the display 114. Where a touch screen device is used, the displays 112 and 114 can comprise the same or parts of the same display. User inputs to the touch screen display are processed by, for example, the touch screen input control 112 of the input device 104. The input device 104 can also be configured to process new content and communications to the system 100. The navigation module 122 can provide controls and menu selections, and process commands and requests. Application and content objects can be provided by the menu control system 124. The process control system 132 can receive and interpret commands and other inputs, interface with the application module 180, storage device 180 and serve content as required. Thus, the user interface 102 of the embodiments described herein, can include aspects of the input device 104 and output device 106.

Figure 4A:
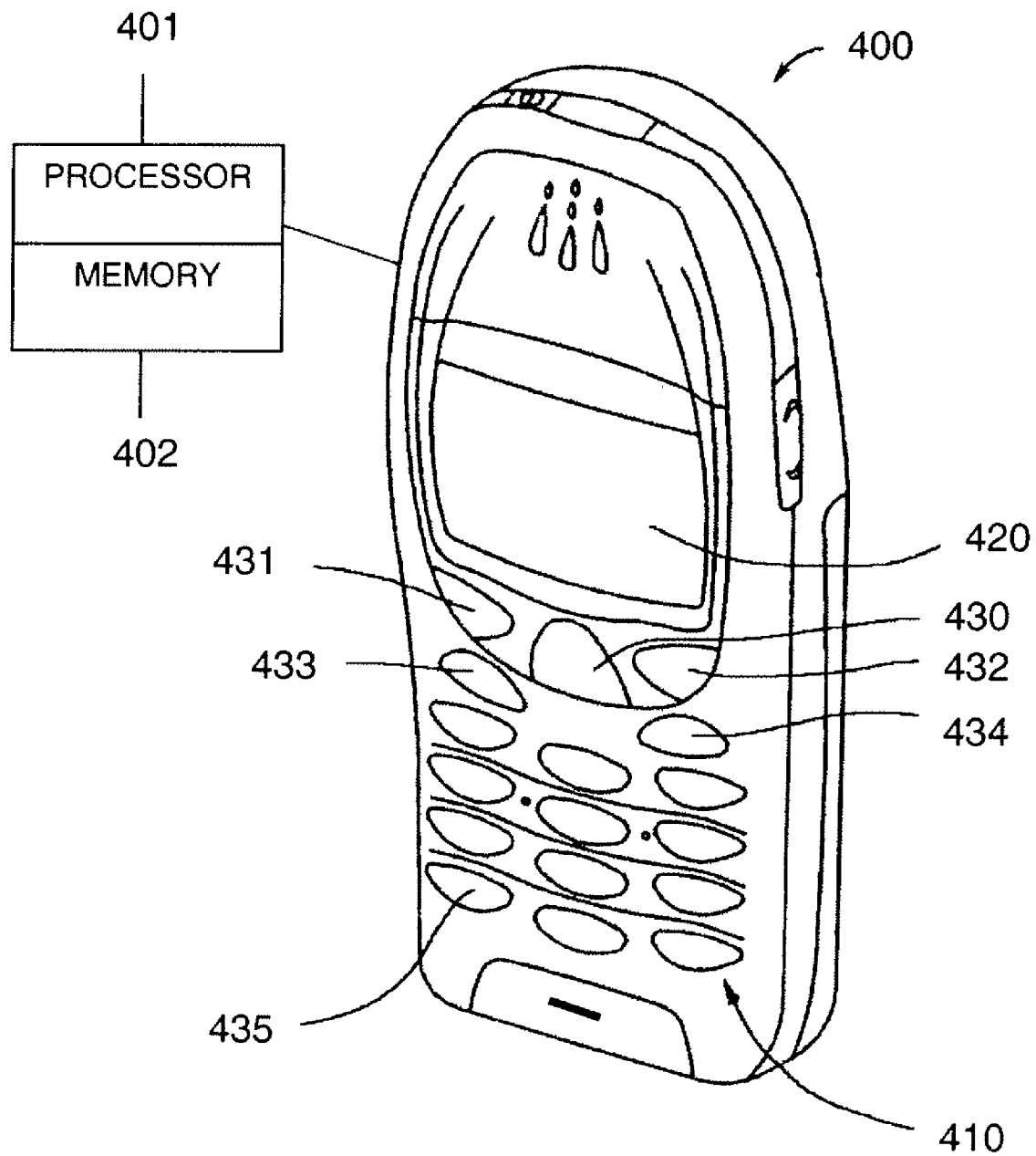
FIGS. 4A-4B are illustrations of examples of devices that can be used to practice aspects of the disclosed embodiments.
Figure 4B:
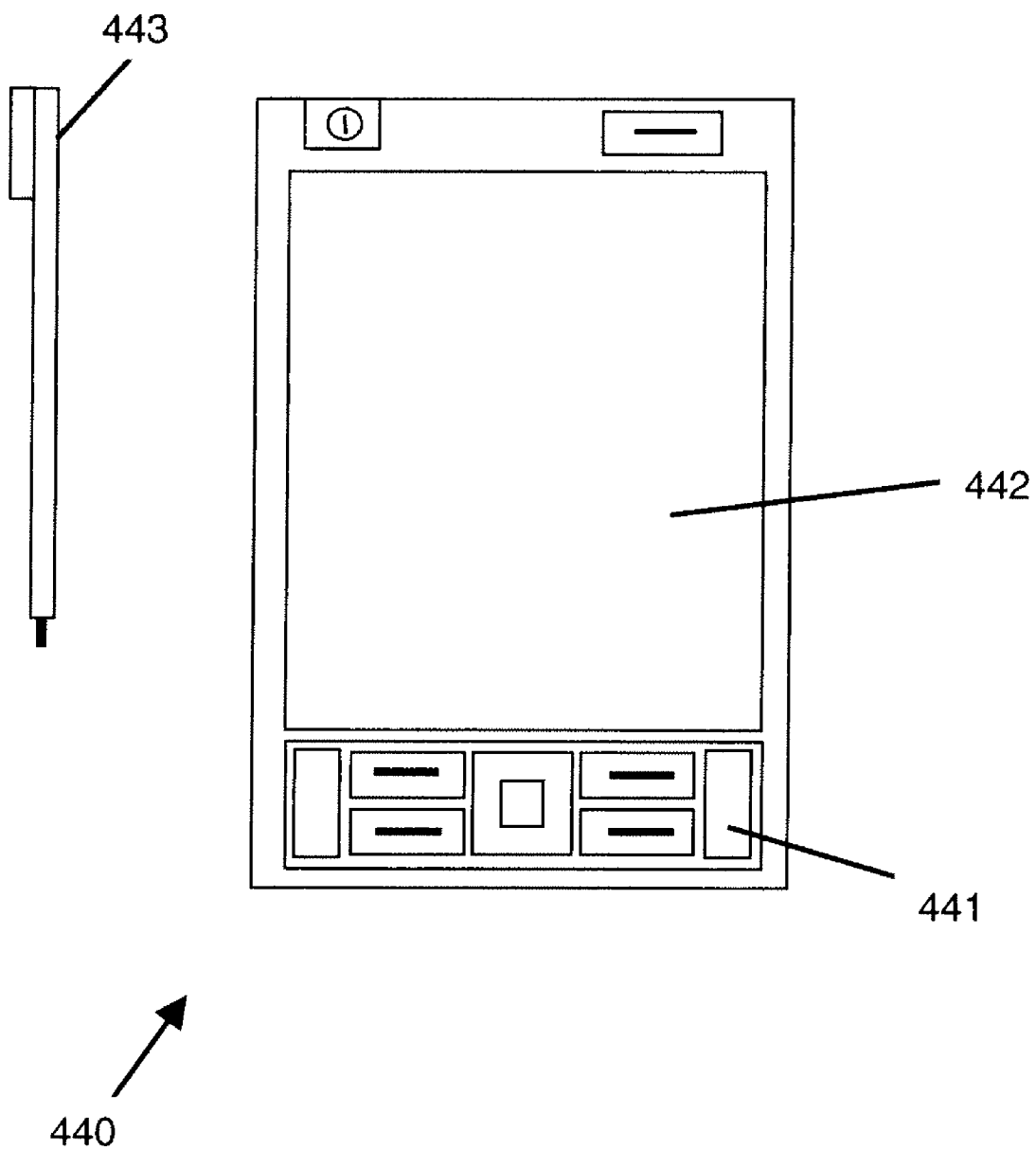
Figure 6:
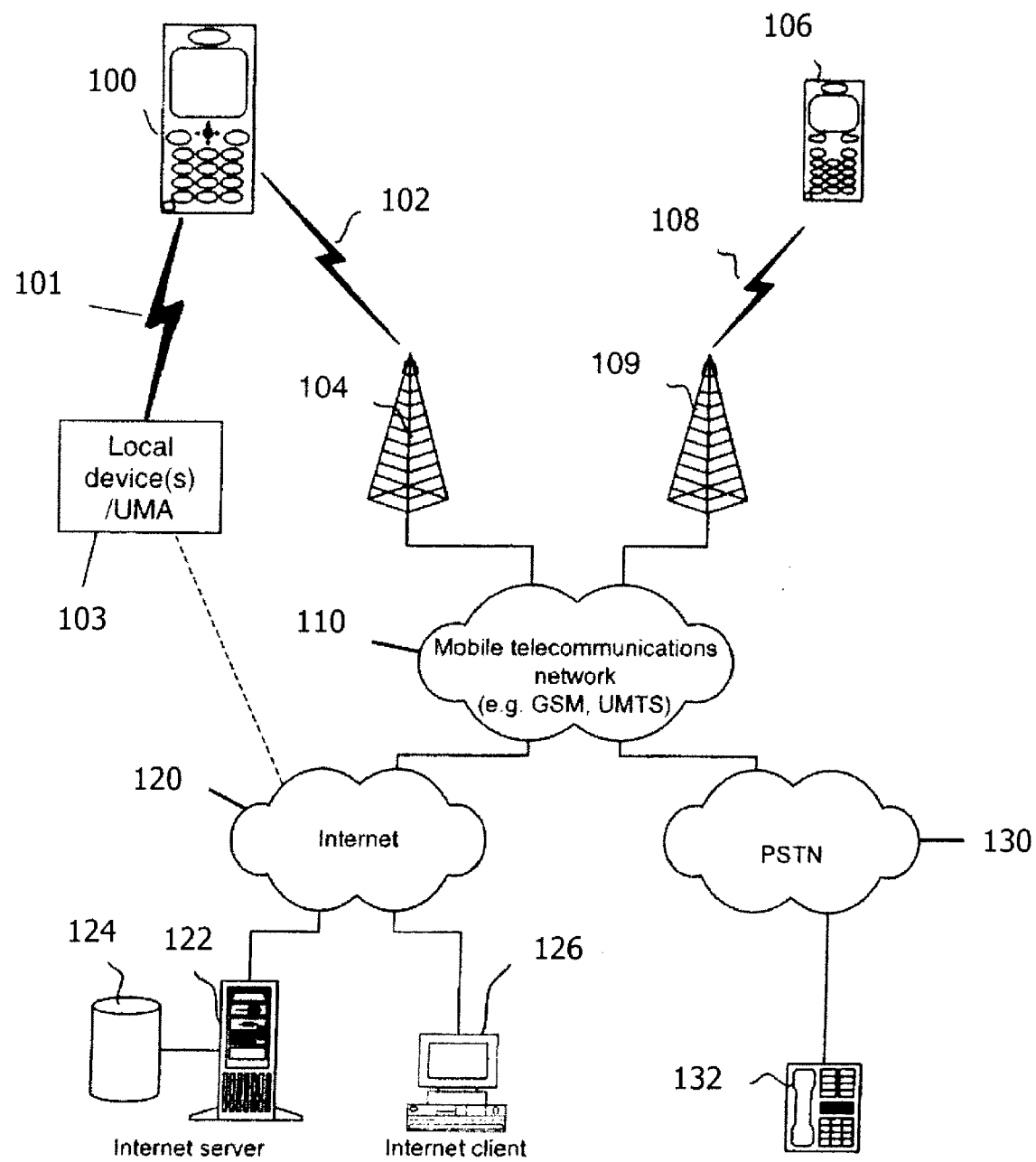
FIG. 6 is a block diagram illustrating the general architecture of the exemplary local system of FIGS. 4A-4B.

Examples of devices on which aspects of the disclosed embodiments can be practiced are illustrated with respect to FIGS. 4A and 4B. The terminal or mobile communications device 400 may have a keypad 410 and a display 420. The keypad 410 may include any suitable user input devices such as, for example, a multi-function/scroll key 430, soft keys 431, 432, a call key 433, an end call key 434 and alphanumeric keys 435. The display 420 may be any suitable display, such as for example, a touch screen display or graphical user interface. The display may be integral to the device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display. The device 400 may also include other suitable features such as, for example, a camera, loud speaker, connectivity port or tactile feedback features. The mobile communications device may have a processor 401 connected to the display for processing user inputs and displaying information on the display 420. A memory 402 may be connected to the processor 401 for storing any suitable information and/or applications associated with the mobile communications device 400 such as phone book entries, calendar entries, etc. In the embodiment where the device 400 comprises a mobile communications device, the device can be adapted to communication in a telecommunication system, such as that shown in FIG. 6. In such a system, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 600 and other devices, such as another mobile terminal 606, a line telephone 632, a personal computer 651 or an internet server 622. It is to be noted that for different embodiments of the mobile terminal 600 and in different situations, some of the telecommunications services indicated above may or may not be available. The aspects of the disclosed embodiments are not limited to any particular set of services in this respect.

The mobile terminals 600, 606 may be connected to a mobile telecommunications network 610 through radio frequency (RF) links 602, 608 via base stations 604, 609. The mobile telecommunications network 610 may be in compliance with any commercially available mobile telecommunications standard such as for example GSM, UMTS, D-AMPS, CDMA2000, (W)CDMA, WLAN, FOMA and TD-SCDMA.

The mobile telecommunications network 610 may be operatively connected to a wide area network 620, which may be the internet or a part thereof. An internet server 622 has data storage 624 and is connected to the wide area network 620, as is an internet client computer 626. The server 622 may host a www/wap server capable of serving www/wap content to the mobile terminal 600.

A public switched telephone network (PSTN) 630 may be connected to the mobile telecommunications network 610 in a familiar manner. Various telephone terminals, including the stationary telephone 632, may be connected to the PSTN 630.

The mobile terminal 600 is also capable of communicating locally via a local link 601 or 651 to one or more local devices 603 or 650. The local links 601 or 651 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 603 can, for example, be various sensors that can communicate measurement values to the mobile terminal 600 over the local link 601. The above examples are not intended to be limiting, and any suitable type of link may be utilized. The local devices 603 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 600 may thus have multi-radio capability for connecting wirelessly using mobile communications network 610, WLAN or both. Communication with the mobile telecommunications network 610 may also be implemented using WiFi, WiMax, or any other suitable protocols, and such communication may utilize unlicensed portions of the radio spectrum (e.g. unlicensed mobile access (UMA)). In one embodiment, the navigation module 122 of FIG. 1 can include a communication module that is configured to interact with the system described with respect to FIG. 6.

In one embodiment, the system 100 of FIG. 1 may be for example, a PDA style device 440 illustrated in FIG. 4B. The PDA 440 may have a keypad 441, a touch screen display 442 and a pointing device 443 for use on the touch screen display 442. In still other alternate embodiments, the device may be a personal communicator, a tablet computer, a laptop or desktop computer, a television or television set top box, or any other suitable device capable of containing the display 442 and supported electronics such as a processor and memory. The exemplary embodiments herein will be described with reference to the mobile communications device 400 for exemplary purposes only and it should be understood that the embodiments could be applied equally to any suitable device incorporating a display, processor, memory and supporting software or hardware.

The user interface 102 of FIG. 1 can also include a menu system 124 in the navigation module 122. The navigation module 122 provides for the control of certain states, processes and utilities of the device 100. The menu system 124 can provide for the selection of different tools and application options related to the applications or programs running on the device 100. In the embodiments disclosed herein, the navigation module 122 receives certain inputs, such as for example, signals, transmissions, instructions or commands related to the functions of the device 100. Depending on the inputs, the navigation module interprets the commands and directs the process control 132 to execute the commands accordingly.

Activating a control generally includes any suitable manner of selecting or activating a function associated with the device, including touching, pressing or moving the input device. In one embodiment, where the input device 104 comprises control 110, which in one embodiment can comprise a device having a keypad, pressing a key can activate a function. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

In one embodiment, the input device 104 can include a force detection and measurement unit 111 that is configured to detect and measure the amount of force applied to the input device 104. For example, in one embodiment, the amount of force applied to the media content transmit key 204 of FIG. 2C is used to determine the extent to which the dispersion indicator 210 expands within the frame 212. A greater amount of force may cause the indicator to expand more quickly. The force may need to be applied for a certain period of time in order for the indicator 210 to expand fully. The force detection unit 111 can be coupled to the keys 110, touch screen display 112, or even a proximity display, to interpret and transmit suitable commands to the navigation module that will execute corresponding changes in the dispersion indicator 210.

Although the above embodiments are described as being implemented on and with a mobile communication device, it will be understood that the disclosed embodiments can be practiced on any suitable device. For example, the device 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the device 100 of FIG. 1 may be a personal communicator, a mobile phone, a tablet computer, touch pad, a laptop or desktop computer, a television or television set top box a DVD or High Definition player or any other suitable device capable of containing for example a display 114 shown in FIG. 1, and supported electronics such as the processor 401 and memory 402 of FIG. 4. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 1, the display 114 of the device 100 can comprise any suitable display, such as noted earlier, a touch screen display or graphical user interface. In one embodiment, the display 114 can be integral to the device 100. In alternate embodiments the display may be a peripheral display connected or coupled to the device 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen may be used instead of a conventional LCD display.

The device 100 may also include other suitable features such as, for example, a camera, loudspeaker, connectivity port or tactile feedback features.

Figure 5:
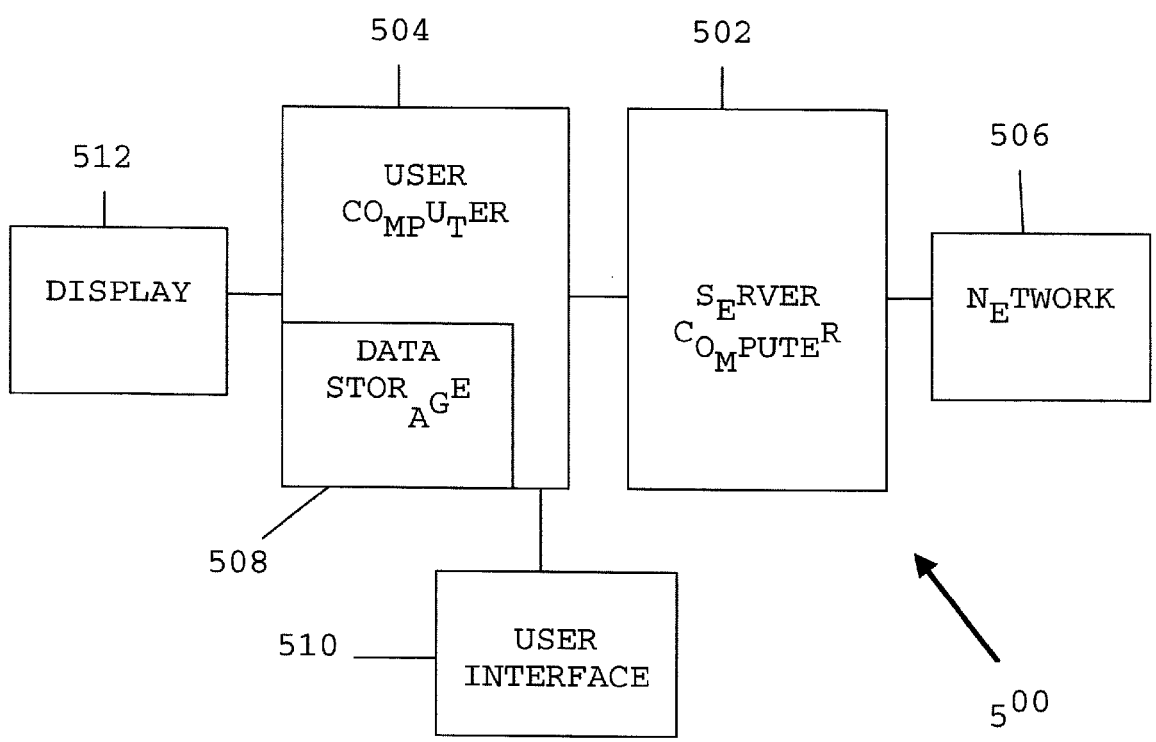
FIG. 5 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 5 is a block diagram of one embodiment of a typical apparatus 500 incorporating features that may be used to practice aspects of the invention. The apparatus 500 can include computer readable program code means for carrying out and executing the process steps described herein. As shown, a computer system 502 may be linked to another computer system 504, such that the computers 502 and 504 are capable of sending information to each other and receiving information from each other. In one embodiment, computer system 502 could include a server computer adapted to communicate with a network 506. Computer systems 502 and 504 can be linked together in any conventional manner including, for example, a modem, wireless, hard wire connection, or fiber optic link. Generally, information can be made available to both computer systems 502 and 504 using a communication protocol typically sent over a communication channel or through a dial-up connection on ISDN line. Computers 502 and 504 are generally adapted to utilize program storage devices embodying machine-readable program source code, which is adapted to cause the computers 502 and 504 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 502 and 504 may also include a microprocessor for executing stored programs. Computer 502 may include a data storage device 508 on its program storage device for the storage of information and data. The computer program or software incorporating the processes and method steps incorporating aspects of the invention may be stored in one or more computers 502 and 504 on an otherwise conventional program storage device. In one embodiment, computers 502 and 504 may include a user interface 510, and a display interface 512 from which aspects of the invention can be accessed. The user interface 510 and the display interface 512 can be adapted to allow the input of queries and commands to the system, as well as present the results of the commands and queries.

The disclosed embodiments generally provide a way to avoid sending messages in error to more than one person. The more recipients a message has, the more effort on the part of the user is required, as a confirmation that more than one recipient was intended. As a distribution list increases the action by the user in conjunction with the activation of the send or transmits key increases. The additional action might be a longer press, more pressure or reacting to other visual or audio cues.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method comprising:
   providing an expandable element associated with a message transmit key of a device;
   expanding an outer border of the expandable element to reflect a number of recipients of a message to be sent from the device;
   activating a message transmit key of the device to cause an enablement of the initiation of the transmission of message to each of the recipients; and
   expanding a size of an inner region within the outer border to reflect a state of the message transmission enablement, wherein the size of the inner regions expands to fill an area within the outer border in order to enable the transmission of the message to each recipient.

2. The method of claim 1 further comprising continuing to activate the message transmit key until the inner region fills the area within the outer border to transmit the message to each recipient.

3. The method of claim 1 wherein activating the message transmit key comprises applying a pre-determined force to the message transmit key after an initial contact with the key to cause the inner region to expand within the area confined by the outer border.

4. The method of claim 3 further comprising applying a greater level of force to be applied to the message transmit key in order to completely fill the area with the outer border prior to transmitting the message.

5. The method of claim 4 wherein a greater degree of force on the message transmit key causes the area within the outer border to fill more quickly than a lesser degree of force.

6. The method of claim 1 further comprising a size of the area within the outer border region to expand proportionally to a number of intended recipients of the message.

7. The method of claim 1 further comprising the inner region filling the area within the expanded outer border before the message is transmitted.

8. The method of claim 1 further comprising providing an audio indicator corresponding to a state of expanding the inner region within the area encompassed by the outer border.

9. The method of claim 1 further comprising providing a visual contrast between the area within the expanded border region and the inner region.

10. The method of claim 1 further comprising delaying an actual transmission of the message to each recipient until the inner region substantially fills the area within the outer border.

11. The method of claim 1 wherein the message comprises media content and transmitting the message comprises publishing the content.

12. A user interface comprising:
    a message transmit key of a device;
    an expandable element displayed with the message transmit key;
    a defined outer border region of the expandable element, the defined outer border configured to move away from an origin of the expandable element in an outward direction to reflect a number of recipients of a message to be sent from the device;
    the message transmit key of the device being configured to cause the initiation of the message transmitted to each of the recipients; and
    a defined region within the outer border region configured to move away from the origin of the expandable element to reflect a state of the message transmission to each of the recipients, wherein the size of the defined region expands to fill an area within the outer border in order to send the message to each recipient.

13. The user interface of claim 12 further comprising a force indication field configured to provide an indication of an effort required to transmit the message.

14. The user interface of claim 12 further comprising a security indication field that is configured to provide an indication that transmission of the message is imminent.

15. The user interface of claim 12 further comprising an audio indicator configured to provide an audio indication corresponding to the state of message transmission.

16. An apparatus comprising:
    a controller configured to process, receive and transmit media content;
    an input device coupled to the controller; and
    a display interface device coupled to the controller, wherein the controller further comprises a processor, the processor being configured to:
    provide an expandable element associated with a media content transmit key of the input device;
    expand an outer border of the expandable element to reflect a number of recipients designated to receive media content to be sent from the apparatus to the recipients;
    cause the initiation of the media content transmission to when a media content transmit input is received from the media content transmit key of the input device; and
    expand a size of an inner region within the outer border to reflect a state of the media content transmission as a force is applied to the media content transmit key, wherein the size of the inner regions expands to fill an area within the outer border to correspond with enabling the media content to be transmitted to each recipient prior to the media content transmission from the apparatus.

17. The apparatus of claim 16 wherein the processor is configured to provide a pre-transmission indication to a user when the size of the inner region fills the area within the outer border, prior to transmission of the media content.

18. The apparatus of claim 17 wherein the processor is configured to detect a transmission enable input to the input device responsive to the pre-transmission indication prior to transmission of the media content.

19. The apparatus of claim 16 wherein the processor is further configured to detect a pre-determined force applied to the media content transmit key that causes the expansion of the inner region, wherein the expansion of the inner region only occurs during application of the pre-determined force.

20. The apparatus of claim 16 further comprising an audio unit coupled to the controller, the processor being configured to cause the audio unit to provide an audio indication corresponding to the expansion of the size of the inner region within the area of the outer border.

21. A system comprising:
    means for providing an expandable element associated with a media content transmit key of a device;

means for expanding an outer border of the expandable element to reflect a number of recipients of a media content to be sent from the device;

means for detecting activation of a media content transmit key of the device to cause an enablement of the initiation of the transmission of the media content to each of the recipients; and means for expanding a size of an inner region within the outer border to reflect a state of the enablement of the media content transmission to each of the recipients, wherein the size of the inner regions expands to fill an area within the outer border in order to enable the transmission of the media content to each recipient.

22. The system of claim 21 further comprising:

means for to providing a pre-transmission indication to a user when the size of the inner region fills the area within the outer border, prior to transmission of the media content; and means for detecting a response to the pre-transmission indication prior to transmission of the media content.

23. A computer program product stored in a memory comprising:

a computer useable medium having computer readable code means embodied therein for causing a computer to transmit media content, the computer readable code means in the computer program product comprising:

computer readable program code means for causing a computer to expand an outer border of an expandable element on a display of a device to correspond to a number of designated recipients of the media content;

computer readable program code means for causing a computer to recognize a command to expand an element within an area encompassed by the outer border to initiate enablement of the media content transmission;

computer readable program code means for causing a computer to expand the element with the area for the duration of the command;

computer readable program code means for causing a computer to generate an indication when the element within the area encompassed by the outer border is filled by the element; and computer readable program code means for causing a computer to transmit the media content to the designated recipients upon recognition of a transmit command.

24. The computer program product of claim 23 further comprising computer readable program code means for causing a computer to recognize a force applied to an input mechanism of the device as the command to expand the element.

* * * * *